United States Patent [19]

Losch et al.

[11] Patent Number: 5,707,156
[45] Date of Patent: Jan. 13, 1998

[54] CASTING

[75] Inventors: Dieter Losch, Igersheim; Christof Heuberger, Marbach, both of Germany

[73] Assignee: ITT Automotive Europe GmbH, Frankfurt, Germany

[21] Appl. No.: 676,160

[22] PCT Filed: Jan. 13, 1995

[86] PCT No.: PCT/EP95/00139

§ 371 Date: Jul. 15, 1996

§ 102(e) Date: Jul. 15, 1996

[87] PCT Pub. No.: WO95/19507

PCT Pub. Date: Jul. 20, 1995

[30] Foreign Application Priority Data

Jan. 15, 1994 [DE] Germany ............ 44 01 051.6

[51] Int. Cl.$^6$ ............................................ F16C 17/02
[52] U.S. Cl. ........................................ 384/302; 384/286
[58] Field of Search ............................ 384/129, 302, 384/286, 297, 299, 300

[56] References Cited

U.S. PATENT DOCUMENTS 3,873,056  3/1975  Parkinson .
4,208,075  6/1980  Templeton .
4,971,459  11/1990  McKenna .

FOREIGN PATENT DOCUMENTS

WO 9519507   7/1995   European Pat. Off. .
20 31 653    11/1970  France .
31 03 868    9/1982   Germany .
89 11 391 U  12/1989  Germany .
880309376    6/1990   Japan .
22 3 27 27   12/1990  United Kingdom .

*Primary Examiner*—Lenard A. Footland
*Attorney, Agent, or Firm*—Thomas N. Twomey; J. Gordon Lewis

[57] ABSTRACT

A cast element comprises an elongated cast body having an axial opening in a direction of its axis thereof, and first and second friction bearings at ends of the axial opening. The friction bearings are formed as a single piece with the cast body, and each friction bearing consists of several slide elements with a space between them. Each of the slide elements has a cross section shaped like a cylindrical ring segment, and the slide elements of the first bearing are circumferentially alternate with the slide elements of the second bearing.

3 Claims, 2 Drawing Sheets

CASTING

TECHNICAL FIELD

The invention pertains to castings and more particularly relate to castings having an opening extending in the axial direction and which is used to hold a shaft or axle.

BACKGROUND OF THE INVENTION

Cast elements of this kind are known. They are produced both from metallic materials and from plastics. In the former case, pressure casting methods are used for their manufacture, and in the second case, injection molding methods are used. In these methods, nondestructive molds are used, which necessitate a relatively simple casting structure. Above all, undercuts must be prevented. In order to preserve the openings in the material for shafts and axles, core pieces are installed. The shape of the core pieces must be simple so that they can be easily removed from the cast element after the casting process.

Cylindrical core pieces cannot be used since the core piece can only be withdrawn from the cast element with difficulty. Between the surface of the cylindrical core piece and the inside wall of the cast element, considerable frictional forces will occur when pulling out the core piece. For this reason it is not possible to create a cast element with an opening for a shaft that is seated in the cast element at two locations from friction bearings with the same diameter.

In these cases a stepped shaft design has been substituted, and in the opening of the cast element, two bearings with different diameters are used. The transition region between the bearings is shaped conically, so that the corresponding conically shaped core piece can be easily detached from the cast element. With a gentle tug in the axial direction, the conical surface of the core loosens from the conically shaped inside surface of the cast element.

But this procedure necessitates the production of a stepped shaft, and this is associated with increased costs. For some applications, even a minor increase in cost is not acceptable.

Therefore the invention solves the problem of designing a cast element of the aforementioned type so that a shaft with a uniform cross section can be seated, whereby the core which is needed for casting of the cast element can be easily detached from the east element after the casting process.

In this regard the invention proposes that a cast element of the aforementioned type features friction bearings which are interrupted in the perimeter direction. Preferably each friction bearing consists of several mutually spaced slide elements which each consists of a cylindrical segment, and the cylindrical segments of one bearing are offset to the cylindrical segments of the other bearing. The inside surfaces of the cylindrical segments form the friction bearing for the shaft and/or the axle, whereby the inside surfaces of both friction bearings are located on circles that have the same diameter.

The offset positioning of the cylindrical segments of the two bearings makes it possible for the region between the bearings to be structured so that a correspondingly shaped core piece can easily be detached from the cast element.

In this case it is necessary that the angle regions in which the cylindrical segments are found do not overlap. The inside of the opening in the region between the bearings is now divided into perimeter segments according to the angular organization of the cylindrical segments. In this case each section runs in an axial direction, tapered to the side on which a bearing ring segment is located in the particular sector.

Expressed differently, a sector of the inside of the intermediate region in the opening ends on one side in an opening between two bearing segments and on the other side in a bearing segment. On one side, the distance of the sector to the bearing axis corresponds to the diameter of the opening between two bearing segments, whereas on the other side, the distance of the sector to the bearing axis corresponds to the diameter of the inside surface of a cylindrical segment.

Preferably, on the latter side, the distance of the sector to the bearing axis is somewhat greater than the inside diameter of the bearing segment, so that the transition occurs gradually.

One core element for a mold to produce a cast element of this kind consists preferably of two partial elements which can be inserted one into the other.

Each partial element or slide consists of a first cylindrical region having recesses which correspond to the cylindrical segments of the bearing. Adjoining this is a second region, also having recesses into which the corresponding opposing pieces of the other slide can be inserted.

The side walls that define the additional recesses in the perimeter direction align in an axial direction with the walls for the recesses of the cylindrical segments.

In addition, because the recesses in both regions pass one into the other, the result is that the corresponding opposing piece of the other slide—once the slides are joined together—forms a wall of the recess in the first region.

The outward-facing surface of the second region of each slide runs conically tapered in the direction of the end of the slide which is facing away from the first region. This corresponds to the intended conical tapering in the corresponding sectors in the transition region of the cast element between the bearings.

The recesses in the second region and the associated counterpieces in the second region of the other slide are designed with respect to each other so that, after assembly of the slides, a compact unit is formed in the transition region, whereby only the recesses which are needed to form the bearing ring segments remain in the first regions of the slides.

DETAILED DESCRIPTION OF THE PREFERRED EMBODIMENTS

Figure 1:
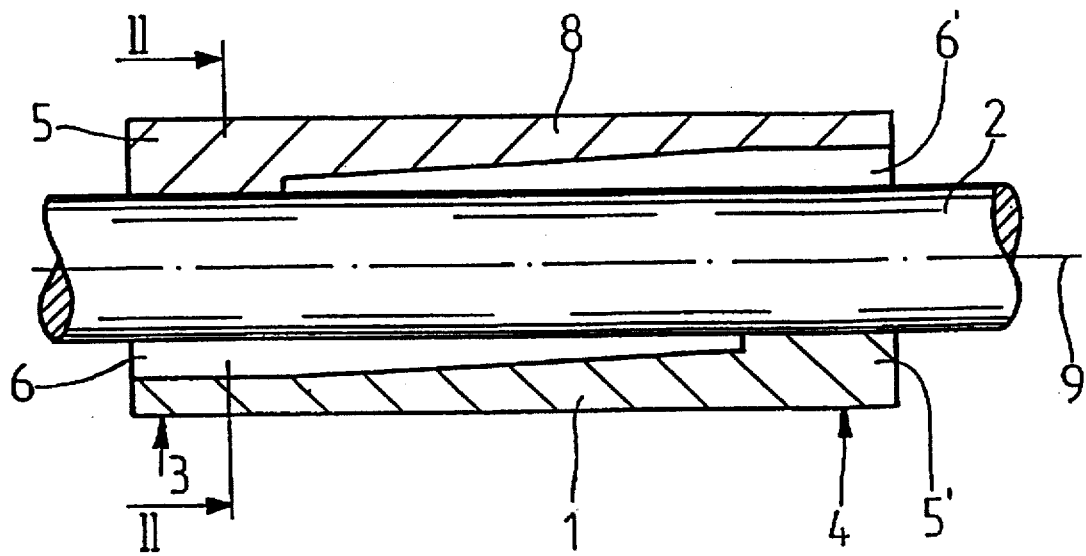
FIG. 1. A highly stylized form of a longitudinal cross section through a cast element along line I—I of FIG. 2
Figure 2:
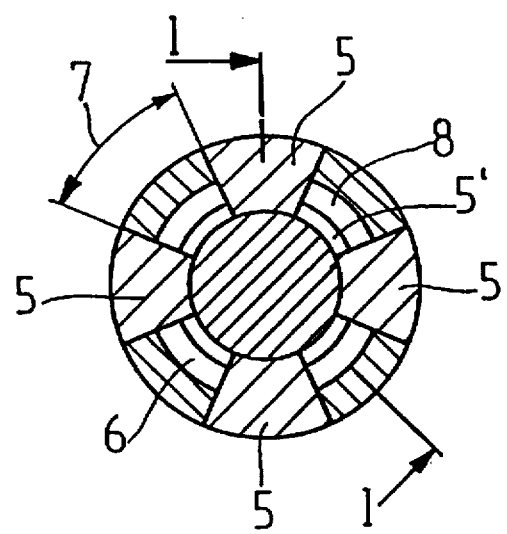
FIG. 2. A cross section along line II—II in FIG. 1.

In FIG. 1, 1 denotes a cast element, and 2 denotes a shaft which is seated in this casting. In this case, at one end of cast element 1 there is a bearing 3 and at the other end of cast element 1 there is a bearing 4. Both bearings pertain to friction bearings which have the same design. As is shown in the cross section in FIG. 2, the bearing ring is not a solid ring, but is interrupted. Thus a bearing consists of single bearing pieces 5, 5', which are each formed from a cylindrical segment. Between the bearing pieces 5, 5' there are openings 6, 6' whose cross sections likewise form ring-like segments. The opening angles 7 of the segments are of equal size both for the bearing pieces 5 and the openings 6, and are distributed uniformly along the perimeter. In the sample embodiment there are four bearing pieces, separated by four openings.

The bearings 3 and 4 are of the same design, but they are offset in a manner such that in the angle region in which one bearing piece 5 is provided for one bearing 3, in the other bearing 4, an opening 6' is present, and vice-versa.

The sector 8 between the bearings, which can be designated as a mold-release region, is structured as follows. Circumferential sectors extend from one bearing to the other bearing, whereby the width of one sector in the perimeter direction corresponds to the angular width of one bearing piece or to the corresponding opening of the other bearing. Each sector runs at an angle to the bearing axis 9 such that the distance to the bearing axis at the end where a bearing element 5 is located, is smaller than at the end where the sector passes into an opening 6.

The result of this arrangement is that from perimeter sector to perimeter sector, the angular position of the surface tilts, now in one direction, now in the other direction, to the rotational axis 9.

An opening of a cast element formed in such a manner is obtained by a two-part core piece. Each part of the core piece features a mold-release region which is of conical design and forms the perimeter sector of the cast element which extends conically in the pulling-out direction. Thus each portion of the core piece can, after casting, be pulled out to the appropriate side of the opening.

Figure 3:
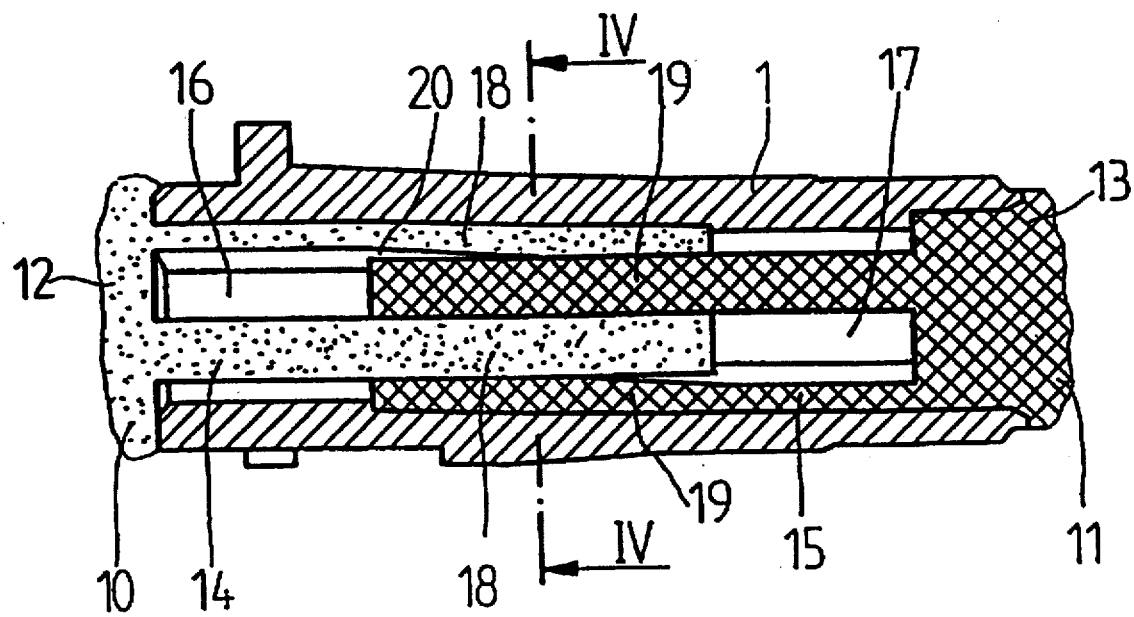
FIG. 3. A perspective view of a two-part core piece and a longitudinal cross section through the cast element.

A core piece consisting of two slides 10 and 11 is illustrated in FIG. 3 in a cut section of cast element 1.

The slides 10 and 11 each feature a head 12, 13. Adjoining the head there is a cylindrical region 14 or 15 having recesses 16, 17 which are formed as cylindrical ring segments corresponding to the bearing pieces to be cast.

The external surface of the slide is illustrated as a dotted line or as cross-hatching, while the particular bottoms and the walls of the recess are shown without shading.

The second sector 18, 19 of the slides 10, 11 tapers conically outward and features recesses located in the extensions of the recesses in the first sector.

The second sector 18 of the second slide consists essentially of a massive element at whose outer edge there are sectors 20 shaped like cylindrical ring segments.

Accordingly, the second sector 19 of the second slide 11 consists of individual, axially extending feet, whose cross section is shaped like a ring segment and whose dimensions fit into the recesses 20 of the first slide 10.

Figure 4:
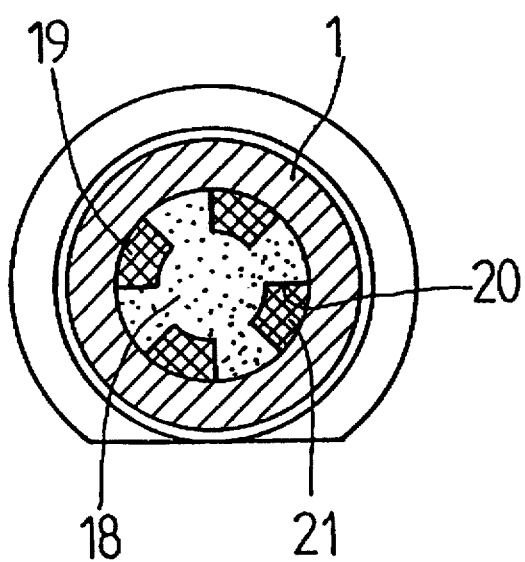
FIG. 4. A cross section along line IV—IV in FIG. 3.

If we consider a cross section along the line IV—IV in FIG. 3, then in FIG. 4 it is clear that the second sector 18 of the slide 10 is essentially massive and features recesses 20 at the outer edge, whereas the second sector 19 of the second slide 11 features correspondingly shaped feet 21.

For casting of the cast element, the two slides 10, 11 are inserted one into the other, so that a consistent core is produced, which features at its ends recesses 16, 17 for the bearing pieces 5 to be formed and which is significantly massive in its middle section that by sectors the slopes of the walls are tilted toward each other.

In the casting process the recesses 16, 17 are inserted into the first sectors 14, 15, and this process produces the slide pieces.

The core is removed by pulling each slide 10, 11 out to one side or the other. In this case the core again breaks into its parts. Each slide can be easily loosened, since the surface contour of its second sector is at a suitable incline. The corresponding pieces are pulled through the openings between the bearing pieces.

What is claim is:

1. A cast element, comprising: an elongated cast body having an axial opening in a direction of an axis thereof, and first and second friction bearings at ends of the axial opening, the friction bearings being formed as a single piece with the cast body, wherein each friction bearing consists of several slide elements with a space therebetween, each of the slide element having a base and an end and a cross section shaped like a cylindrical ring segment, the slide elements of said first bearing being circumferentially offset with respect to the slide elements of said second bearing.

2. The cast element according to claim 1, wherein the opening is divided circumferentially in a transition region between the first and second bearings into perimeter sectors corresponding to an angular arrangement of the slide elements of each of the bearings, and each perimeter sector runs in the axial direction, each of the slide elements of said first and second friction bearings being located in a respective perimeter sector in such a way that the slide elements of the first bearing are circumferentially alternate with respect to the slide elements of the second bearing.

3. The cast element according to claim 2, wherein a distance between the slide element and the axis in the transition region is greater than a distance between the same slide element and the axis at the base of the slide element.

* * * * *